United States Patent [19]

Ichikawa et al.

[11] 4,135,220
[45] Jan. 16, 1979

[54] MECHANISM TO PREVENT UNWANTED TAPE EJECTION IN A MAGNETIC TAPE DEVICE

[75] Inventors: Hiroki Ichikawa, Hachioji; Kazumi Miyazi, Fuchu, both of Japan

[73] Assignee: Olympus Optical Co., Ltd., Tokyo, Japan

[21] Appl. No.: 825,413

[22] Filed: Aug. 17, 1977

[30] Foreign Application Priority Data

Aug. 19, 1976 [JP] Japan .............................. 51-11120[U]
Aug. 19, 1976 [JP] Japan .............................. 51-11120[U]

[51] Int. Cl.² ............................................ G11B 15/00
[52] U.S. Cl. .................................................. 360/137
[58] Field of Search .......................... 360/137, 96, 105

[56] References Cited

U.S. PATENT DOCUMENTS

| 3,947,895 | 3/1976 | Suzuki | 360/137 |
| 4,017,900 | 4/1977 | Katsurayana | 360/96 |
| 4,017,902 | 4/1977 | Sato | 360/137 |
| 4,071,865 | 1/1978 | Nakasuna | 360/137 |

Primary Examiner—Jay P. Lucas

[57] ABSTRACT

A linking mechanism for a magnetic tape device includes a slide plate moved in association with the operation of a fast tape wind mechanism or re-wind mechanism and a tape eject stop lever which is rotated by the slide plate to such a position as to prohibit a tape eject button from actuating a tape eject mechanism.

8 Claims, 5 Drawing Figures

MECHANISM TO PREVENT UNWANTED TAPE EJECTION IN A MAGNETIC TAPE DEVICE

BACKGROUND OF THE INVENTION

This invention relates to a linking mechanism for a magnetic tape device, which prevents an erroneous tape ejection during recording or erasing operation.

There have been developed such magnetic tape devices as can erase a tape while the tape is wound fast or re-wound fast. In a magnetic tape device of this type the erase head is kept in contact with a magnetic tape all the time the tape is being erased. Thus it should be prevented that the tape would be ejected erroneously under this condition.

SUMMARY OF THE INVENTION

An object of this invention is to provide a linking mechanism for a magnetic tape device, which has a simple construction and operatively connects the fast tape wind and fast tape re-wind mechanisms, and the tape eject button of the magnetic tape device in such a manner that a tape ejection is avoided without fail during the recording operation or the erasing operation.

DETAILED DESCRIPTION OF THE PREFERRED EMBODIMENT

Figure 1:
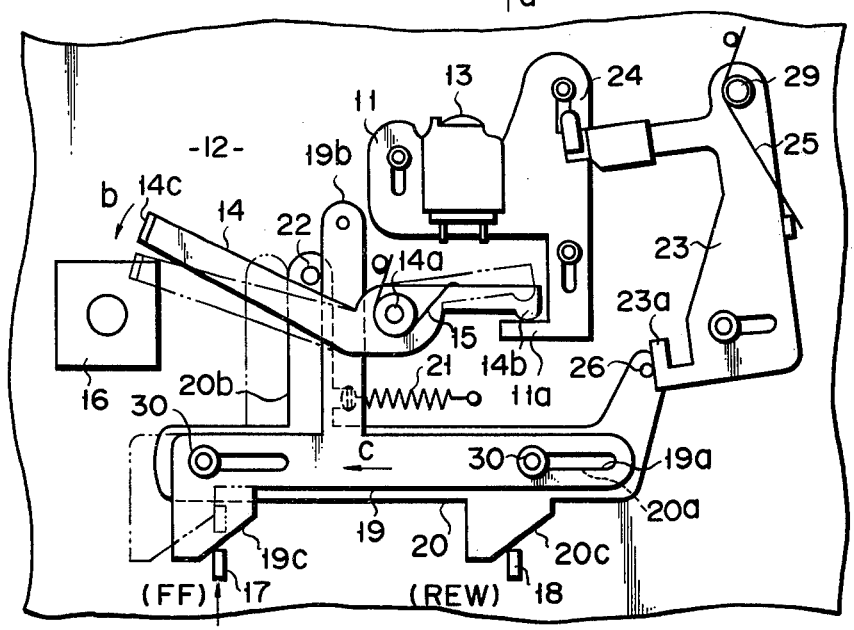
FIG. 1 is a plan view of a linking mechanism in one operation condition according to an embodiment of this invention.
Figure 2:
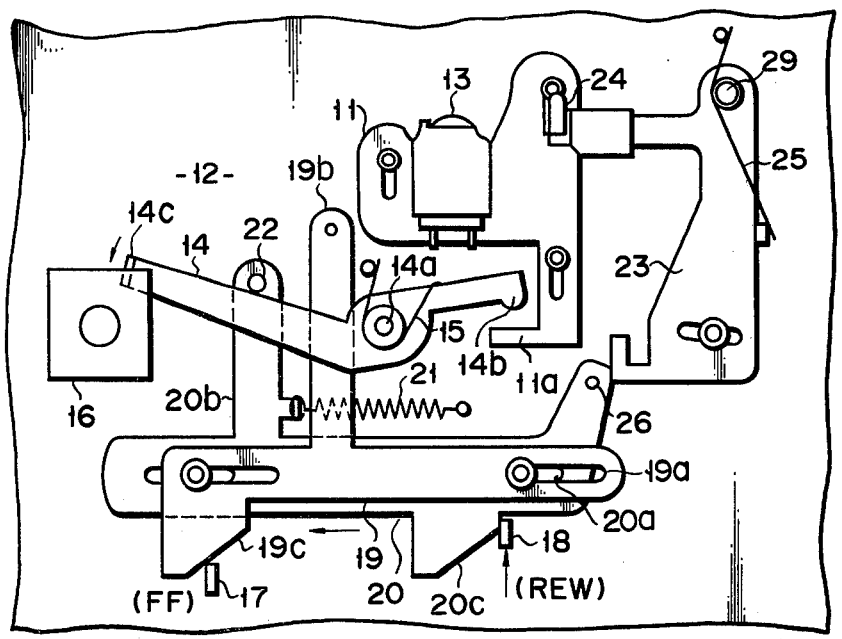
FIG. 2 is a plan view of the linking mechanism of FIG. 1 in another operational condition.

With reference to FIGS. 1 and 2, an embodiment of this invention, i.e. a linking mechanism for magnetic tape device will be described.

The linking mechanism 10 is mounted on the panel or substrate 12 of a magnetic tape device. Also on the panel 12 a head-supporting plate 11 is disposed linearly movable in the direction of arrow $a$. On the head-supporting plate 11 a magnetic head 13 of well-known type is fitted with its scanning face directed to the front of the magnetic tape device. The head-supporting plate 11 has an engagement projection 11$a$ which extends to the rear side of the magnetic tape device. The engagement projection 11$a$ is kept in contact with one end 14$b$ of a stop lever 14, the middle portion of which is pivotally supported by a pin 14$a$ on the panel 12.

A formed wire or spring 15 is wound around the pin 14$a$ at the central portion. One end of the spring 15 is secured to the panel 12 through a pin, while the other end pushes that portion of the stop lever 14 which is adjacent to the end 14$b$. Thus the spring 15 urges the stop lever 14 to rock clockwise. As a result, the end 14$b$ of the lever 14 keeps pushing the engagement projection 11$a$ of the head-supporting plate 11, thereby to urge the plate 11 toward the rear of the magnetic tape device.

The other end 14$c$ of the stop lever 14 extends slantwise toward the front of the magnetic tape device and is positioned near a tape eject button 16 in a non-locking position as shown in FIG. 1. If the lever 14 is rocked counterclockwise or in the direction of arrow $b$ against the urging force of the spring 15, the end 14$c$ moves under the tape eject button 16.

The eject button 16 is to actuate a tape eject mechanism of well-known type which is designed to eject a tape cassette from the tape pocket of the magnetic tape device. When the button 16 is depressed, the tape eject mechanism starts working.

A fast wind (FF) lever 17 and a fast re-wind (REW) lever 18 are juxtaposed with an erase lever (not shown), a reproduction operating lever (not shown) and a record stop lever (not shown) on the panel 12 and along the rear side of the magnetic tape device. These levers 17 and 18 are to put the associated mechanisms (not shown) into operation, when moved toward the front of the magnetic tape device. They are of well-known type. When relieved from force, they are made to return to the initial positions by return springs (not shown) provided for them, respectively.

Between the head-supporting plate 11 and the levers including the FF and REW levers, there are provided two elongated slide plates 19 and 20 which extend to both the left and right sides of the magnetic tape device. One slide plate 19 is superposed above the other slide plate 20. The slide plate 19 has two elongated holes 19$a$, one at each end portion. Similarly, the slide plate 20 has two elongated holes 20$a$, one at each end portion. These holes extend in the lengthwise direction of the slide plates 19 and 20. Two guide pins 30 protrude from the panel 12 and loosely pass through the holes 19$a$ and 20$a$. The slide plates 19 and 20 can therefore slide for a distance, for example, in the direction of arrow $c$ while guided by the guide pins 30.

There is provided a coil spring 21, one end of which is attached to the lower slide plate 20 and the other end of which is secured to the panel 12. It urges the slide plate 20 always in the direction opposite to the direction of arrow $c$.

The slide plates 19 and 20 have arms 19$b$ and 20$b$, respectively, which extend from the middle portions of the respective slide plates toward the front of the magnetic tape device. On the end of the arm 20$b$ there stands upright an engagement shaft 22 which normally contacts the left edge of the arm 19$b$. Thus, when the upper slide plate 19 is shifted to the left i.e. in a direction of arrow $c$, the lower slide plate 20 is shifted leftwards, too. Further, the engagement shaft 22 normally contacts the front edge of the slanting portion of the stop lever 14. Therefore, when the lower slide plate 20 is shifted to the left, the lever 14 is rocked in the direction of arrow $b$, and its end 14$c$ comes under the tape eject button 16 to prevent the button 16 from to be moved further downward.

The upper slide plate 19 has an edge 19$c$ which inclines at a predetermined angle to the longitudinal axis of the slide plate 19 and which faces the FF lever 17. As the FF lever 17 is pushed toward the front of the magnetic tape device and pushes in turn the inclined edge 19$c$, the slide plate 19 is shifted to the left by the leftward component of the force exerted by the FF lever 17. Similarly, the lower slide plate 20 has an inclined edge 20$c$ facing the REW lever 18 and is shifted leftwards when the REW lever 18 is pushed toward the front of the magnetic tape device.

The tape eject button 16 is a two-step push button. When it is depressed to the first step, the cover of the tape cassette pocket is released from a lock and is opened. When the tape eject button 16 is depressed to the second step, a tape eject mechanism comes into operation, thereby to eject the tape cassette from the tape cassette pocket. The mechanism for opening and closing the cover and the tape eject mechanism are of well-known type, and not therefore illustrated in the drawings or described here in detail.

There is further provided an erase head supporting lever 23 which is rockably supported by a pin 29 secured to the panel 12. An erase head 24 is attached to one end of the supporting lever 23. The lever 23 is always urged clockwise by a formed wire or spring 25. The other end 23a of the lever 23 is in contact with a stop pin 26 in a non-erasing position protruding from the right end portion of the lower slide plate 20. In this way the lever 23 is prevented from rocking clockwise despite the urging force of the spring 25. Further, the supporting lever 23 is prevented by another member (not shown) from rocking clockwise.

When the FF lever 17 or the REW lever 18 is pushed toward the front of the magnetic tape device, the lower slide plate 20 is shifted to the left against the coil spring 21. Thus, the stop pin 26 also moves to the left. Then the erase head supporting lever 23 is rocked clockwise to cause the erase head 24 to move toward the front of the magnetic tape device and to come into contact with a magnetic cassette tape placed in the tape cassette pocket.

When the play button (not shown) of the magnetic tape device is depressed, the motor circuit (not shown) is closed thereby to rotate the reel drive shaft and capstan shaft (both not shown) of the magnetic tape device. Further, upon depression of the play button, the head-supporting plate 11 is moved to the front of the magnetic tape device until the magnetic head 13 comes into contact with the magnetic cassette tape in the tape cassette pocket, whereby the tape play is started. As the head-supporting plate 11 moves toward the front of the magnetic tape device, the stop lever 14 is rocked counterclockwise, and its end 14c comes to a position under the tape eject button 16. If the button 16 is pushed under this condition, it is depressed to such extent as to open the cover of the tape cassette pocket. But the button 16 cannot be depressed further and cannot actuate the tape eject mechanism.

When both the FF lever 17 and the erase lever (not shown) are pushed toward the front of the magnetic device, the play button returns to its initial position, and so does the head-supporting plate 11. But the end 14c of the stop lever 14 remains under the tape eject button 16 as shown in FIG. 2 for the following reason. As the FF lever 17 is moved toward the front of the magnetic tape device, the upper slide plate 19 moves to the left, i.e. in the direction of arrow c. Since the arm 19b of the slide plate 19 is in contact with the engagement shaft 22 on the arm 20b of the lower slide plate 20, the lower slide plate 20 moves in the direction of arrow c, too. Thus, the engagement shaft 22 also moves in the direction of arrow c so as to rock the end 14c of the stop lever 14 counterclockwise and to move the same to a position under the tape eject button 16. As a result, the button 16 can be depressed to such extent as to open the cover of the tape cassette pocket, but cannot be depressed further. Consequently, the tape ejection is prohibited. Meanwhile, upon depression of the erase lever the head-supporting lever 23 is made rockable. As the lower slide plate 20 moves in the direction of arrow c, the stop pin 26 moves in the same direction, thereby allowing the head-supporting lever 23 to rock clockwise. As a result, the erase head 24 comes into contact with the magnetic cassette tape. In this way, the erasing operation is carried out while the tape is being wound fast.

When both the erase lever and the REW lever 18 are pushed toward the front of the magnetic device, the head-supporting lever 23 is made rockable and only the lower slide plate 20 is shifted in the direction of arrow c. As the lower slide plate 20 moves to the left, the head-supporting lever 23 rocks clockwise until the erase head 24 comes into contact with the magnetic cassette tape. In this way, the erasing operation is carried out while the tape is being re-wound fast. Also in this case the stop lever 14 is rocked counterclockwise by pushing the slant edge of the lever with the engagement shaft 22 and the end 14c of the arm 14 finally comes to a position under the tape eject button 16. Thus, the button 16 cannot be depressed fully enough to actuate the tape eject mechanism.

The erase lever cannot be pushed toward the front of the magnetic tape device if the lug to prevent an erroneous erasing is torn off the magnetic tape cassette. Thus, if the lug is torn off, any erroneous erasing operation is avoided.

Figure 3:
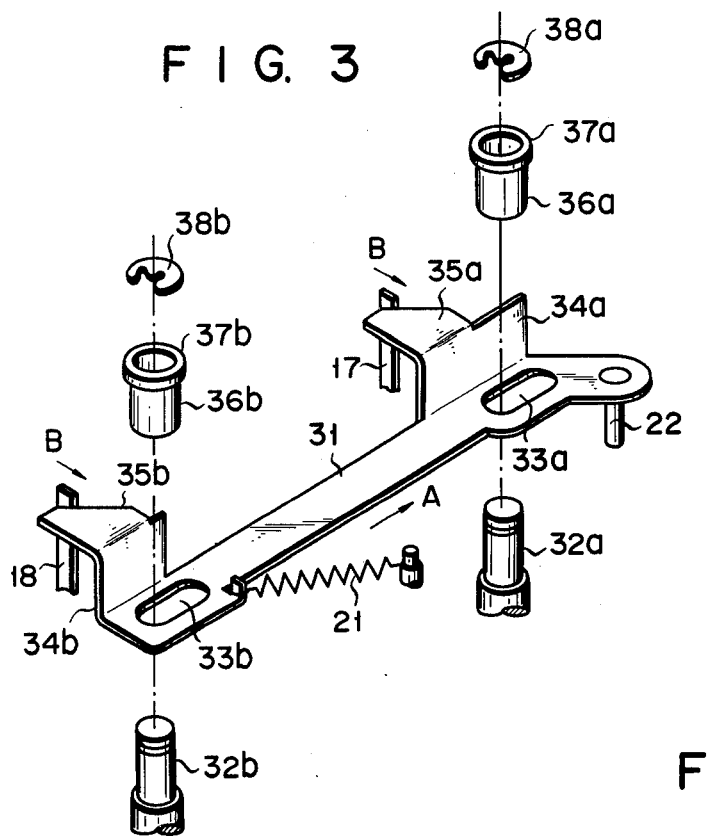
FIG. 3 is an exploded view of a modification of a slide mechanism used in the linking mechanism.
Figure 5:
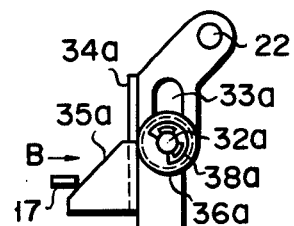
FIG. 5 is a cross-sectional view of the slide mechanism taken along line 5—5 in FIG. 4.
Figure 4:
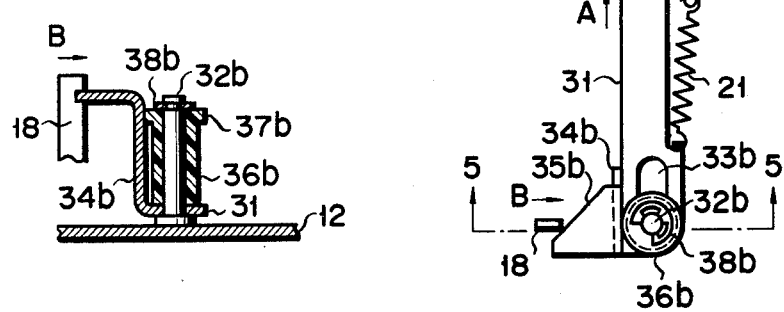
FIG. 4 is a plan view of the slide mechanism shown in FIG. 3.

In the above-mentioned embodiment of this invention use is made of a pair of slide plates. Instead, such a single plate as illustrated in FIGS. 3, 4 and 5 may be employed. As shown in FIG. 3, this slide plate 31 has two elongated holes 33a and 33b, each at each end portion. These holes 33a and 33b extend in the lengthwise direction of the slide plate 31. Two guide pins 32a and 32b protrude from the panel 12 of a magnetic tape device and loosely pass through the holes 33a and 33b, respectively. Thus, the slide plate 31 can slide freely in its lengthwise direction. The slide plate is normally urged in the direction of arrow A by a spring 21 secured to the panel 12. From one lateral edge of the slide plate 31 there extend upright a pair of strips 34a and 34b, near the holes 33a and 33b, respectively. The end portions of the strips 34a and 34b are bent substantially at 90° so as to extend horizontally away from the slide plate 31. The bent end portions of the strips 34a and 34b have inclined edges 35a and 35b, respectively, each of which is inclined at about 45° to the direction of arrow A. These inclined edges 35a and 35b face an FF lever 17 and a REW lever 18, respectively.

The FF lever 17 and the REW lever 18 can be moved in the direction of arrow B which is parallel to the planes including the panel 12 and the slide plate 31 and perpendicular to the direction of arrow A and the axes of the guide pins 32a and 32b. Two tubular rollers 36a and 36b made of a hard synthetic resin are rotatably fitted on the guide pins 32a and 32b, respectively. These rollers 36a and 36b have flanges 37a and 37b which are kept in contact with the surface of the strip 34a and the surface of the strip 34b, respectively. E rings 38a and 38b are fitted respectively to the tips of the guide pins 32a and 32b, thereby to prevent the rollers 36a and 36b from slipping off the respective guide pins 32a and 32b.

Being structured as shown in FIGS. 3, 4 and 5, the slide plate 31 is shifted against the urging force of the spring 21 in the direction opposite to arrow A when the FF lever 17 or the REW lever 18 is pushed in the direction of arrow B. When shifted in this way, the slide plate 31 rocks, through an engagement shaft 22, a stop lever in such a direction as to bring one end of the stop lever to a position under a tape eject button, whereby a tape eject mechanism is prohibited from working.

What we claim is:

1. In a linking mechanism for magnetic tape device comprising a tape eject mechanism for ejecting a tape cassette from a tape cassette pocket, a tape eject button for actuating the tape eject mechanism, fast tape wind mechanism and/or re-wind mechanism, and a head-supporting plate movable to a playing position, the improvement being that there is provided a slide mechanism movable in association with the operation of said fast tape wind mechanism or re-wind mechanism and a tape eject stop mechanism movable to a prohibiting position to prohibit said tape eject button from actuating said tape eject mechanism, a first engageable device provided between the slide mechanism and the tape eject stop mechanism to move the tape eject stop mechanism to the prohibiting position in association with the movement of the slide mechanism, and a second engageable device provided between the head-supporting plate and the tape eject stop mechanism to move the tape eject stop mechanism to the prohibiting position in association with the movement of the head-supporting lever to the playing position.

2. A linking mechanism according to claim 1, wherein said tape eject stop mechanism has a stop lever which is so moved by said slide mechanism that its one end is brought to a position under said tape eject button thereby to prohibit the depression of said tape eject button and thus the actuation of said tape eject mechanism.

3. A linking mechanism according to claim 2, wherein said tape eject stop mechanism has a pin supporting said stop lever rotatably at the middle portion thereof, a spring urging said one end of the stop lever to move away from under said tape eject button, and said first engageable device comprising an engagement section formed integrally with said stop lever so as to come into engagement with said slide mechanism thereby to bring said end of the stop lever to a position under said tape eject button against the urging force of said spring.

4. A linking mechanism according to claim 3, wherein said slide mechanism has first and second slide plates superposed one upon the other and made movable in their lenghtwise direction, said first engageable device further comprising an engagement shaft which protrudes upright from said first slide plate and which engages with the engagement section of said stop lever when said first slide plate moves, thereby to rotate the stop lever in such a manner as to bring said end thereof to a position under said tape eject button, a spring urging the first and second slide plates in one direction, and a drive section formed on the first slide plate so as to move the first slide plate against the urging force of the spring in association with said fast tape wind and/or re-wind mechanism.

5. A linking mechanism according to claim 4, wherein said drive section includes at least two strips the edges of which are inclined to the direction in which said first slide plate moves, said inclined edges being exerted with a thrust force thereby to shift said first slide plate in said direction.

6. A linking mechanism according to claim 3, wherein said slide mechanism has a slide plate made movable in its lengthwise directions, said first engageable device further comprising an engagement shaft which protrudes upright from one end portion of the slide plate and which engages with the engagement section of said stop lever when said slide plate moves, thereby to rotate the stop lever in such a manner as to bring said end thereof to a position under said tape eject button, a spring urging the slide plate in one direction, and a drive section formed on the slide plate so as to move the slide plate against the urging force of the spring in association with said fast tape wind and/or re-wind mechanism.

7. A linking mechanism according to claim 6, wherein said drive section consists of at least two strips the edges of which are inclined to the direction in which said slide plate moves, said inclined edges being exerted with a thrust force thereby to shift said slide plate in said direction.

8. A linking mechanism according to claim 7, wherein said slide plate has at least two elongate holes extending in the lengthwise direction of the slide plate, at least two guide pins loosely passing through the elongated holes, and at least two rollers rotatably mounted on the guide pins, respectively, whose peripheries touch at least partially the surfaces of said strips.

* * * * *